(12) United States Patent
Zhou

(10) Patent No.: US 10,528,285 B2
(45) Date of Patent: Jan. 7, 2020

(54) DATA STORAGE DEVICE AND METHOD FOR OPERATING NON-VOLATILE MEMORY

(71) Applicant: Shannon Systems Ltd., Shanghai (CN)

(72) Inventor: Zhen Zhou, Shanghai (CN)

(73) Assignee: SHANNON SYSTEMS LTD., Shanghai (CN)

( * ) Notice: Subject to any disclaimer, the term of this patent is extended or adjusted under 35 U.S.C. 154(b) by 0 days.

(21) Appl. No.: 16/025,091

(22) Filed: Jul. 2, 2018

(65) Prior Publication Data

US 2019/0121572 A1 Apr. 25, 2019

(30) Foreign Application Priority Data

Oct. 20, 2017 (CN) .......................... 2017 1 0982593

(51) Int. Cl.
*G06F 3/06* (2006.01)

(52) U.S. Cl.
CPC ............ *G06F 3/0655* (2013.01); *G06F 3/061* (2013.01); *G06F 3/0604* (2013.01); *G06F 3/0659* (2013.01); *G06F 3/0679* (2013.01)

(58) Field of Classification Search
CPC .... G06F 3/0655; G06F 3/0679; G06F 3/0604; G06F 3/0659; G06F 3/061; G06F 3/0665
See application file for complete search history.

(56) References Cited

U.S. PATENT DOCUMENTS

| | | | |
|---|---|---|---|
| 6,618,380 B1 * | 9/2003 | Mehta | H04L 47/10 370/395.42 |
| 9,678,983 B1 * | 6/2017 | Wong | G06F 16/183 |
| 2016/0124844 A1 * | 5/2016 | Chang | G06F 12/0253 711/103 |
| 2017/0123722 A1 * | 5/2017 | Sela | G06F 3/0656 |
| 2017/0177487 A1 * | 6/2017 | Ware | G06F 13/1689 |

\* cited by examiner

*Primary Examiner* — Hiep T Nguyen
(74) *Attorney, Agent, or Firm* — McClure, Qualey & Rodack, LLP

(57) ABSTRACT

A data storage device capable of just partially executing a read/write command issued by a host is disclosed. The data storage device uses a controller to perform a partial execution of a first read/write command issued by the host, and returns a breakpoint of the first read/write command to the host and returns information that the first read/write command is in a partial completion status to the host to drive the host to further issue a second read/write command. In this manner, fewer computational resources are required in determining read/write command granularity.

18 Claims, 4 Drawing Sheets

DATA STORAGE DEVICE AND METHOD FOR OPERATING NON-VOLATILE MEMORY

CROSS REFERENCE TO RELATED APPLICATIONS

This Application claims priority of China Patent Application No. 201710982593.X, filed on Oct. 20, 2017, the entirety of which is incorporated by reference herein.

BACKGROUND OF THE INVENTION

Field of the Invention

The present invention relates to data storage devices and methods for operating non-volatile memory, further relating to applications such as electronic devices and data centers.

Description of the Related Art

There are various forms of non-volatile memory (NVM) for long-term data retention, such as flash memory, magnetoresistive RAM, ferroelectric RAM, resistive RAM, spin transfer torque-RAM (STT-RAM), and so on.

A non-volatile memory is generally linked to a host to be operated by the host. The host uses logical addresses to identify the data stored in the non-volatile memory. The physical space of the non-volatile memory is dynamically allocated to correspond to the logical addresses. The host-identified logical addresses do not visually map the physical space of the non-volatile memory. When the host requests to read/write the non-volatile memory according to logical addresses, read/write command granularity that determines the data amount of the read/write command has to be taken into consideration to conform to the computational resources as well as non-volatile memory conditions. The host will spend considerable resources on determining the read/write command granularity.

BRIEF SUMMARY OF THE INVENTION

A data storage device in accordance with an exemplary embodiment of the disclosure has a non-volatile memory and a controller. The controller performs a partial execution of a first read/write command issued by a host, and returns a breakpoint of the first read/write command to the host and returns information that the first read/write command is in a partial completion status to the host to drive the host to further issue a second read/write command.

In another exemplary embodiment, a method for operating a non-volatile memory is disclosed, comprising: performing a partial execution of a first read/write command that a host issues to operate the non-volatile memory; and returning a breakpoint of the first read/write command to the host and returning information that the first read/write command is in a partial completion status to the host, to drive the host to further issue a second read/write command.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
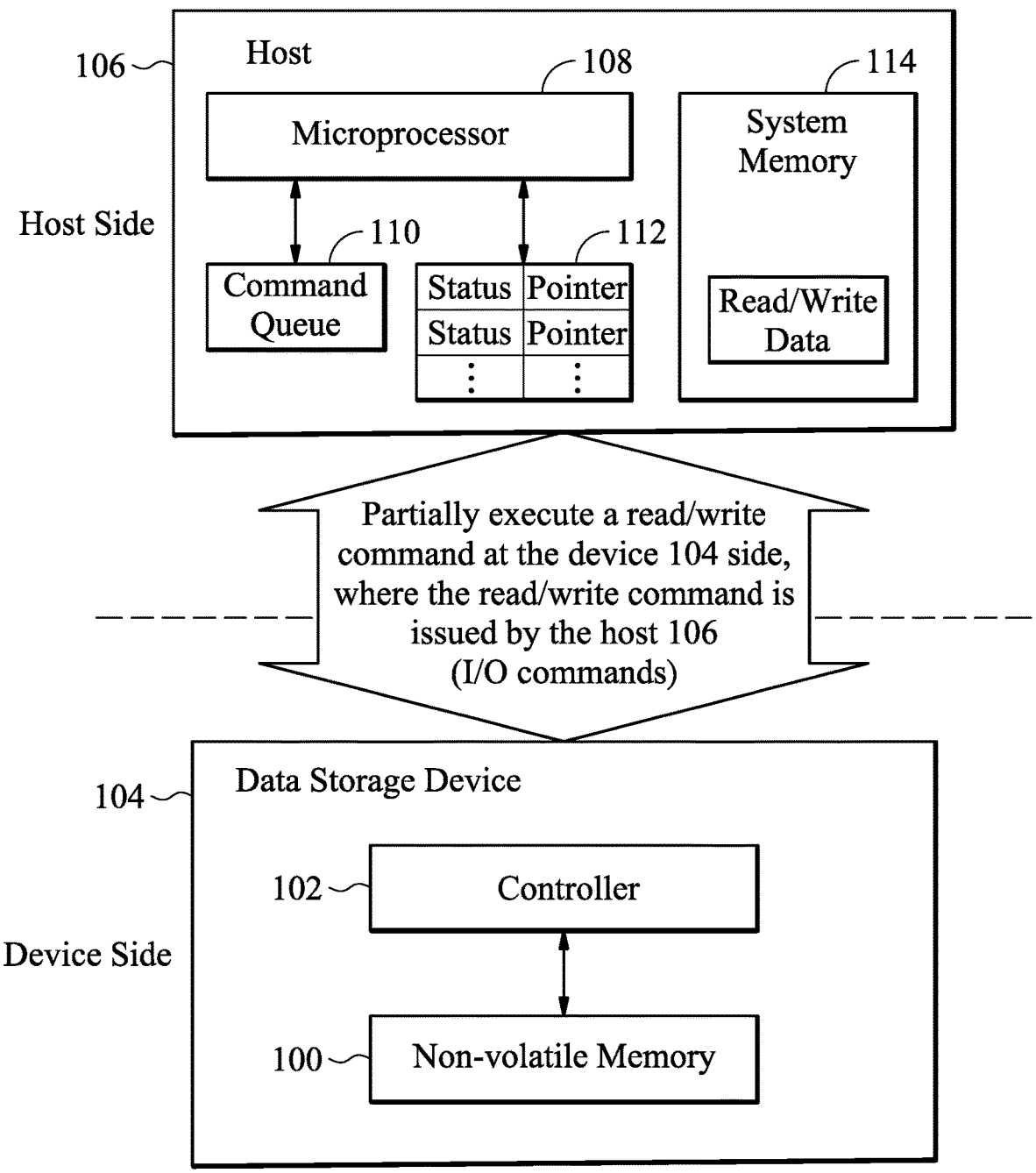
FIG. 1 shows the architecture for operating a non-volatile memory 100 in accordance with an exemplary embodiment of the disclosure.

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive RAM, a ferroelectric RAM, a resistive RAM, a spin transfer torque-RAM (STT-RAM) and so on. A non-volatile memory may be used to implement a data storage device or a data center. The following discussion is regarding flash memory in particular as an example.

A flash memory is often used as a storage medium in today's data storage devices, for implementations of a memory card, a USB flash device, an SSD and so on. In another exemplary embodiment, a flash memory is packaged with a controller to form a multiple-chip package (e.g. to form an eMMC). A data storage device using a flash memory as a storage medium can be applied to a variety of electronic devices, including a smartphone, a wearable device, a tablet computer, a virtual reality device, etc. A calculation module of an electronic device may be regarded as a host that operates a data storage device equipped on the electronic device to access a flash memory within the data storage device.

A data center may be built with flash memories as the storage medium. For example, a server may operate an array of SSDs to form a data center. The server may be regarded as a host that operates the SSDs to access the flash memories within the SSDs.

The host side identifies the flash memory storage contents by logical addresses (for example, according to a logical block address LBA or a global host page number GHP, etc.). In order to optimize the use of the flash memory, the storage space of the flash memory is dynamically allocated to correspond to the logical addresses identified by the host. A flash memory is generally divided into a plurality of blocks. Each block includes a plurality of pages. Each page may be further divided into several storage units. The dynamic space allocation of such small-sized storage units may make the mapping relationship (e.g. managed by a mapping table) between host-identified logical addresses and flash physical space very complicated. The host-identified logical addresses do not visually map the physical space of the non-volatile memory. In particular, when the host issues a logical address to read/write the non-volatile memory, read/write command granularity that determines the data amount of the read/write command has to be taken into consideration to meet the computational resources as well as non-volatile memory conditions.

In order to reduce the computational burden of setting the read/write command granularity, a solution is provided in the disclosure, which allows partial execution at the device side for one read/write command (a.k.a. I/O command) issued by the host. Taking sequential (continuous logical addresses) reading/writing as an example, according to the disclosure, the host does not need to precisely set the read/write command granularity. At the device side, the read/write command received from the host may be only partially executed depending on the system status (e.g. considering the available computational resources, the physical conditions of the non-volatile memory, etc.). There is no need to precisely decide the amount of read/write data at the host side. The unfinished data reading/writing may be requested by the host later.

Such a flexible way that allows partial execution of a read/write command at the device side also facilitates flash operations. An erasure process is required to reuse a physical space. The flash memory needs to be erased in block units. The updated data is written to a spare space and the space storing old data is invalidated. By garbage collection, the sporadic valid data retained in a block is moved to a spare space. The block with only invalid data left can be erased and released for reuse. Since partial execution of a read/write command is allowed at the device side, garbage collection can be inserted into the different reading/writing intervals. In this manner, the computational resources are no longer occupied by read/write commands and garbage collection is not stalled.

In addition, a flash memory may be accessed through multiple channels. A read/write command across several channels or across several logical unit numbers (LUNs) may hamper the system performance. According to the disclosure, considering the system performance, partial execution of a read/write command that hampers system performance is allowed.

FIG. 1 shows the architecture for operating a non-volatile memory 100 in accordance with an exemplary embodiment of the disclosure. The non-volatile memory 100 is combined with a controller 102 to form a data storage device 104. The data storage device 104 is linked to a host 106. In the disclosure, the controller 102 is specially designed and a particular driver program is provided to be executed by the host 106, for partial execution of a read/write command (I/O command) at the device side.

The host 106 includes a microprocessor 108, a command queue 110, a completion queue 112 and a system memory 114. The read/write commands issued by the microprocessor 108 are queued in the command queue 110 waiting to be executed by the controller 102 at the device side to read/write the non-volatile memory 100. The controller 102 may perform a partial execution of the received read/write command. The controller 102 may write the completion queue 112 to inform the microprocessor 108 whether the read/write command is only partially executed and where the breakpoint is at. As shown, the completion queue 112 may include a field for "status" and a field for "pointer". The controller 102 may write the "status" field to show whether a read/write command is completed or just partially executed. The reason why a read/write command is just partially executed may be also recorded in the field "status". For a partially executed read/write command, the controller 102 may use the field "pointer" to indicate a logical address where the partially executed read/write command proceeds to. The system memory 114 may include a DRAM. By a direct memory access (DMA) technology, the data read from the non-volatile memory 100 can be read from the non-volatile memory 100 and written to the system memory 114, and the data to be written to the non-volatile memory 100 can be gotten from the system memory 114 and written to the non-volatile memory 100.

A read/write command that the microprocessor 108 writes to the command queue 110 may request to read/write data of continuous logical addresses. The amount of read/write data (read/write command granularity) can be as large as possible, without being precisely determined at the host 106 side. In an exemplary embodiment, an importance annotation "hint" may be attached to a read/write command, which indicates whether the data storage device 104 needs to execute the received read/write command as completely as possible.

Regarding a read/write command fetched from the command queue 110, the controller 102 may decide whether to only partially execute the fetched read/write command in consideration of the following factors:

Judgment on computational resources. For example, judge whether the system memory 114 provides sufficient space to cache read/write data to allow the direct memory access DMA operating smoothly.

Judgment on command priority. For example, if the read/write command under execution has lower priority than the other commands waiting in the command queue 110, then only partial execution is performed on the read/write command.

Judgment on performance of the non-volatile memory 100. For example, when the nonvolatile memory 100 is a flash memory, it is particularly checked whether the logical unit numbers (LUNs) requested by the read/write command will degrade the flash operation performance (e.g. a request for reading/writing data across several LUNs), and thereby decide whether to only partially execute the read/write command.

Error judgment. For example, no space is remained in the non-volatile memory 100 for data writing, or controller 102 error is detected.

After the controller 102 performs a read/write command in whole or in part, the information for backfilling the completion queue 112 may include:

A partial completion status, to be written to the field "status" to indicate that the read/write command is executed only partially. In an exemplary embodiment, the reason for partial execution (e.g., insufficient computational resources, low command priority, or inefficient non-volatile memory 100 performance, or an error) is also annotated.

A breakpoint of the partial execution, to be written to a field "pointer" to indicate a logical address for the unfinished data reading/writing.

In response to the partial completion status filled in the completion queue 112, the host 106 may perform the following operations:

Terminate the data pre-reading/pre-writing for the read/write command. For example, terminating reading/writing data to the system memory 114 in advance.

Perform other operations. For example, the controller 102 is scheduled to have ample computing capability on releasing space in the non-volatile memory 100 (for example, to perform garbage collection on a flash memory). Thus, the resumed write command can be properly coped with.

Issue a new command to complete the command that was only partially executed. The new command may simply complete the unfinished read/write command without further operations. In another exemplary embodiment, the new command may request to read/write over a larger range in comparison with the read/write range indicated by the unfinished read/write command.

In one embodiment, the host 106 may be multi-core and provide dedicated command queues and completion queues for the different processor cores (or execution threads). According to the disclosure, it is allowed at the device side to only partially execute a read/write command, which makes the multi-core host operates easily. The host 106 does not spend excessive computational resources on setting read/write command granularity or task scheduling. The data storage device 104 can read/write the non-volatile memory 100 in a suitable length depending on the practical system condition, which may take the command priority in consideration.

Figure 2:
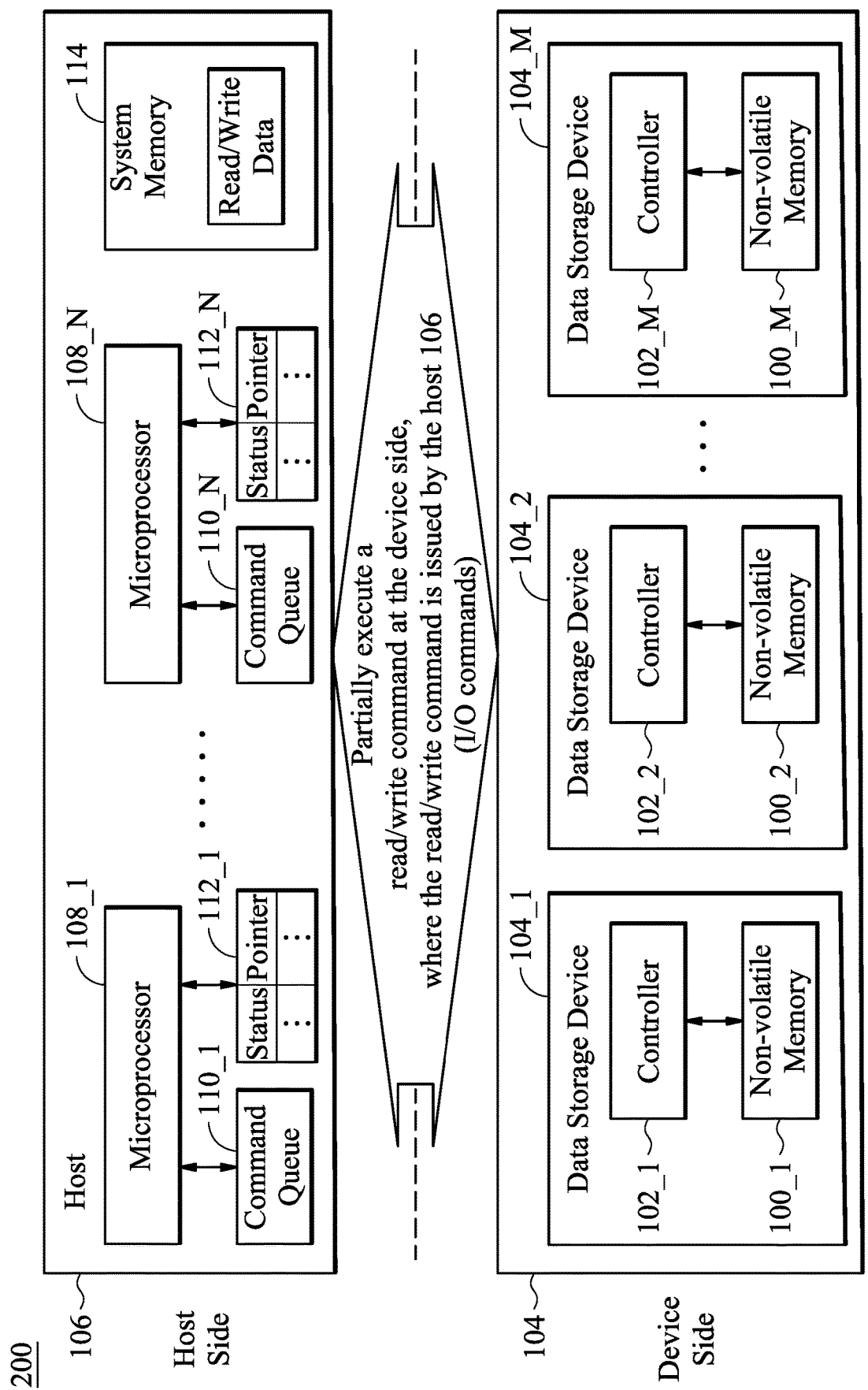
FIG. 2 illustrates a data center 200 in accordance with an exemplary embodiment of the disclosure.

FIG. 2 illustrates a data center 200 in accordance with an exemplary embodiment of the disclosure. The host 106 may be a server, which is in a multi-core architecture with multiple microprocessors 108_1 . . . 108_N (or capable of executing multiple threads). Pairs of command queues and completion queues (110_1 and 112_1 . . . 110_N and 112_N) are provided for the multi-core architecture. At the device side, there are data storage devices 104_1, 104_2 . . . 104_M, using controllers 102_1, 102_2 . . . 102_M to control non-volatile memories 100_1, 100_2 . . . 100_M, respectively. Because partial execution of a command is allowed at the device side, the multi-core server does not need to spend excessive computational resources on the read/write command granularity setting or task scheduling. Based on the status of the corresponding data storage device 104_1, 104_2 . . . 104_M, each of the controllers 102_1, 102_2 . . . 102_M can partially execute the received read/write command.

Figure 3:
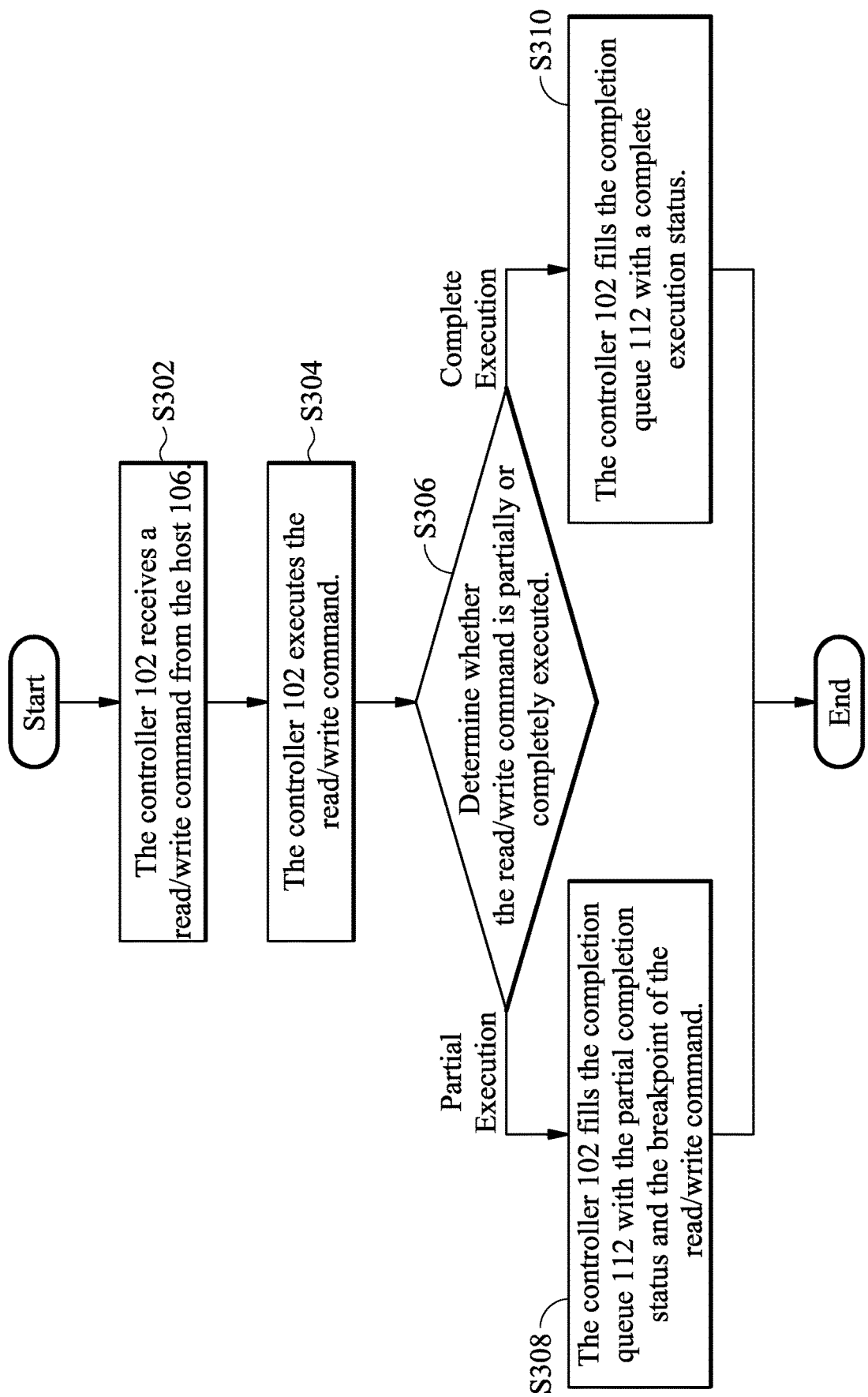
FIG. 3 is a flowchart illustrating how the controller 102 processes a read/write command that the host 106 issues to the non-volatile memory 110 in accordance with an exemplary embodiment of the disclosure.

FIG. 3 is a flowchart illustrating how the controller 102 processes a read/write command that the host 106 issues to the non-volatile memory 110 in accordance with an exemplary embodiment of the disclosure. In step S302, the controller 102 receives a read/write command from the host 106. In step S304, the controller 102 executes the read/write command. Step S304 may perform a complete execution of the read/write command or just a partial execution of the read/write command. The controller 102 may only partially execute the read/write command in consideration of computational resources, command priority, non-volatile memory 100 performance, and/or errors. When it is determined in step S306 that the controller 102 only partially executed the read/write command, the flow proceeds to step S308 and the controller 102 fills the completion queue 112 with the partial completion status and the breakpoint of the read/write command. When it is determined in step S306 that the controller 102 completed the read/write command, the flow proceeds to step S310 and the controller 102 fills the completion queue 112 with a complete execution status.

Figure 4:
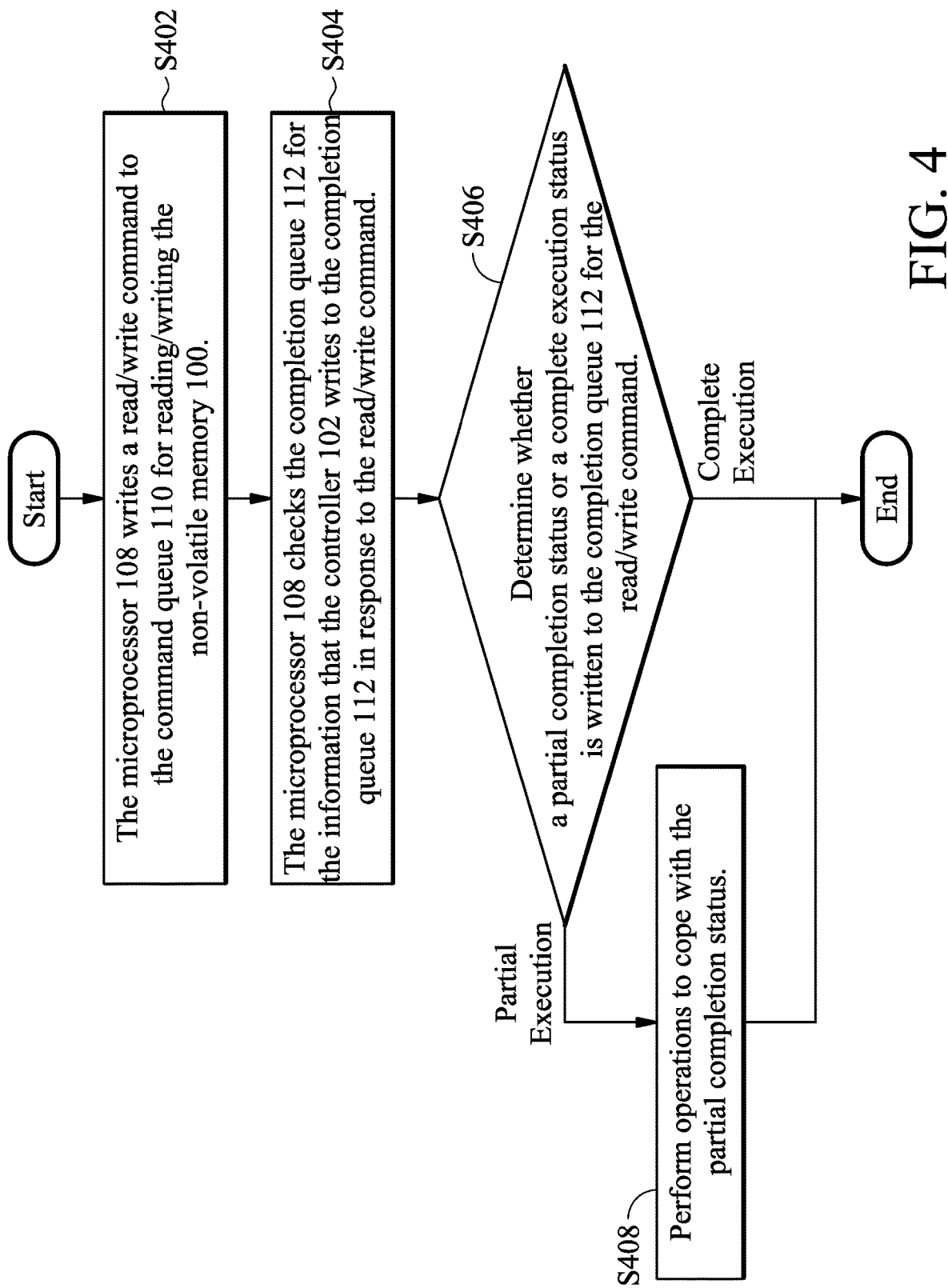
FIG. 4 is a flowchart illustrating how the host 106 acts for a read/write command in accordance with an exemplary embodiment of the disclosure.

FIG. 4 is a flowchart illustrating how the host 106 acts for a read/write command in accordance with an exemplary embodiment of the disclosure. In step S402, the microprocessor 108 writes a read/write command to the command queue 110 for reading/writing the non-volatile memory 100. In step S404, the microprocessor 108 checks the completion queue 112 for the information that the controller 102 writes to the completion queue 112 in response to the read/write command. In step S406, the microprocessor 108 determines whether a partial completion status or a complete execution status is written to the completion queue 112 for the read/write command. Step S408 is performed to cope with the partial completion status. For example, terminate the data pre-reading/pre-writing of the read/write command, proceed to other operations, and issue a new command. When it is determined in step S406 that the completion queue 112 records a complete execution status for the read/write command, the procedure ends.

Other techniques capable of partial execution of a read/write command at the device side are considered within the scope of the disclosure. Based on the above contents, the present invention further relates to methods for operating a non-volatile memory.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a controller, performing a partial execution of a first read/write command issued by a host, and returning a breakpoint of the first read/write command to the host and returning information that the first read/write command is in a partial completion status to the host to drive the host to further issue a second read/write command;
wherein:
the non-volatile memory is a flash memory; and
when executing the first read/write command to read/write the flash memory across logical unit numbers, the controller determines, based on read/write performance of the flash memory, whether to just partially execute the first read/write command.

2. The data storage device as claimed in claim 1, wherein:
the controller further determines whether to just partially execute the first read/write command according to at least one of computational resources, command priority, performance of the non-volatile memory, and error information.

3. The data storage device as claimed in claim 2, wherein:
the first read/write command further uses a hint, which is provided for the controller to determine the command priority.

4. The data storage device as claimed in claim 2, wherein:
the controller performs the partial execution of the first read/write command in response to there being insufficient space in the non-volatile memory.

5. The data storage device as claimed in claim 2, wherein:
the controller further returns a reason of the partial execution of the first read/write command.

6. The data storage device as claimed in claim 5, wherein:
by returning the reason, the controller makes the host terminate pre-reading/pre-writing data to a system memory of the host for the first read/write command.

7. The data storage device as claimed in claim 5, wherein:
by returning information that insufficient space in the flash memory has caused the partial execution of the first read/write command, the controller makes the host leave room for the controller to perform garbage collection to release space in the flash memory.

8. The data storage device as claimed in claim 1, wherein:
the second read/write command requests to read/write a portion requested by the first read/write command that has not been finished.

9. The data storage device as claimed in claim 8, wherein:
the second read/write command requests a greater amount of reading/writing in comparison with the portion that was requested by the first read/write command that has not been finished.

10. A method for operating a non-volatile memory, comprising:
performing a partial execution of a first read/write command that a host issues to operate the non-volatile memory; and
returning a breakpoint of the first read/write command to the host and returning information that the first read/write command is in a partial completion status to the host, to drive the host to further issue a second read/write command,
wherein:
the non-volatile memory is a flash memory; and
when executing the first read/write command to read/write the flash memory across logical unit numbers, a determination is made based on read/write performance of the flash memory to determine whether to just partially execute the first read/write command.

11. The method as claimed in claim 10, further comprising:
determining whether to just partially execute the first read/write command according to at least one of computational resources, command priority, performance of the non-volatile memory, and error information.

12. The method as claimed in claim 11, wherein:
the first read/write command further uses a hint, which is provided for determining the command priority.

13. The method as claimed in claim 11, wherein:
the partial execution is performed on the first read/write command in response to insufficient space in the non-volatile memory.

14. The method as claimed in claim 11, further comprising:
returning a reason of the partial execution of the first read/write command.

15. The method as claimed in claim 14, wherein:
according to the reason, the host terminates pre-reading/pre-writing data to a system memory of the host for the first read/write command.

16. The method as claimed in claim 14, further comprising:
determining whether the partial execution of the first read/write command was caused by insufficient space in the flash memory,
wherein:
in response to there being insufficient space in the flash memory, the host leaves room for garbage collection on the flash memory to release space in the flash memory.

17. The method as claimed in claim 10, wherein:
the second read/write command requests to read/write a portion requested by the first read/write command that has not been finished.

18. The method as claimed in claim 17, wherein:
the second read/write command requests a greater amount of reading/writing in comparison with the portion that was requested by the first read/write command that has not been finished.

* * * * *